(12) United States Patent
Behaghel et al.

(10) Patent No.: US 7,841,187 B2
(45) Date of Patent: Nov. 30, 2010

(54) TURBOMACHINE COMPRISING A SYSTEM FOR COOLING THE DOWNSTREAM FACE OF AN IMPELLER OF A CENTRIFUGAL COMPRESSOR

(75) Inventors: Laurent Behaghel, Montgeron (FR); Jean-Pierre Andre Joseph Mourlan, Nogent sur Marne (FR); Gerard Jacques Stangalini, Fontainebleau (FR)

(73) Assignee: SNECMA, Paris (FR)

( * ) Notice: Subject to any disclaimer, the term of this patent is extended or adjusted under 35 U.S.C. 154(b) by 664 days.

(21) Appl. No.: 11/780,252

(22) Filed: Jul. 19, 2007

(65) Prior Publication Data
US 2008/0141679 A1 Jun. 19, 2008

(30) Foreign Application Priority Data
Jul. 19, 2006 (FR) ................................. 06 06544

(51) Int. Cl.
*F02C 7/18* (2006.01)
(52) U.S. Cl. ............................. 60/785; 60/806; 415/115
(58) Field of Classification Search .................. 60/782, 60/785, 805, 806; 415/115, 116
See application file for complete search history.

(56) References Cited

U.S. PATENT DOCUMENTS

| 4,462,204 | A |   | 7/1984  | Hull |
|-----------|---|---|---------|------|
| 4,761,947 | A | * | 8/1988  | Hennecke et al. ............. 60/806 |
| 4,961,309 | A | * | 10/1990 | Liebl ........................... 60/785 |
| 5,555,721 | A |   | 9/1996  | Bourneuf et al. |
| 6,190,123 | B1 | * | 2/2001 | Wunderwald et al. ........ 415/116 |
| 6,513,335 | B2 | * | 2/2003 | Fukutani ....................... 60/785 |
| 7,252,474 | B2 | * | 8/2007 | Belokon et al. ............. 415/112 |
| 2001/0047651 | A1 | | 12/2001 | Fukutani |

FOREIGN PATENT DOCUMENTS

| EP | 0 346 677 A1 | 12/1989 |
|----|--------------|---------|
| GB | 2 401 912 A  | 11/2004 |

* cited by examiner

*Primary Examiner*—Ted Kim
(74) *Attorney, Agent, or Firm*—Oblon, Spivak, McClelland, Maier & Neustadt, L.L.P.

(57) ABSTRACT

A turbomachine comprising a diffuser—distributor assembly comprising a downstream end-piece connected at its downstream end to means for injecting air for ventilating a turbine and delimiting with the impeller of a centrifugal compressor an annular cavity for the circulation of ventilation air taken from the outlet of the compressor, this turbomachine comprising means for taking air from the injection means and means for guiding this air to the radially internal portion of the downstream face of the impeller.

7 Claims, 2 Drawing Sheets

TURBOMACHINE COMPRISING A SYSTEM FOR COOLING THE DOWNSTREAM FACE OF AN IMPELLER OF A CENTRIFUGAL COMPRESSOR

The present invention relates to a system for cooling the downstream face of an impeller of a centrifugal compressor in a turbomachine such as in particular an aircraft turbojet or turboprop.

BACKGROUND OF THE INVENTION

In a turbomachine of which the final stage of the compressor is of the centrifugal type, a diffuser-distributor assembly is arranged at the outlet of the centrifugal stage and supplies an annular combustion chamber with air.

The diffuser comprises an annular downstream end-piece that is connected at its downstream end to means for injecting air into a circuit for ventilating a turbine situated downstream of the combustion chamber. A portion of the airflow coming out of the distributor flows round the combustion chamber via the inside, while passing between a radially internal wall of the chamber and the end-piece of the diffuser, to supply these air injection means for ventilating the turbine.

An annular cavity is delimited downstream of the impeller of the centrifugal stage by the annular end-piece of the diffuser and must be ventilated, by taking air from the outlet of the centrifugal stage, in order to prevent an increase in temperature of the downstream face of the impeller that would be likely to exceed the maximum temperature admissible by the material of the impeller, the air present in the cavity being driven by the impeller and heated by viscous friction.

DESCRIPTION OF THE PRIOR ART

In order to reduce the heating of the downstream face of the impeller, it has been proposed to increase the flow of air taken from the outlet of the centrifugal stage in order to better ventilate the downstream cavity of the impeller. However, this increases the airflows not working in the turbomachine and degrades its performance.

It has therefore been proposed to mount on the downstream face of the impeller an annular heat protection shield. However, attaching this shield to the impeller is complex and causes an increase in the weight and rotational inertia of the impeller, which reduces the performance of the turbomachine.

In order to prevent the impeller temperature exceeding a maximum admissible value, which is of the order of 500° C. approximately for a titanium impeller, the rotation speed of the impeller has to be limited, which has the consequence of reducing the compression ratio of the air and the performance of the turbomachine.

SUMMARY OF THE INVENTION

The object of the invention is in particular to provide a simple, effective and economic solution to these problems associated with ventilating the downstream cavity of the impeller of a centrifugal compressor in a turbomachine, without causing a reduction in the performance in the turbomachine.

Accordingly, it proposes a turbomachine comprising a diffuser-distributor assembly arranged at the outlet of the impeller of a centrifugal compressor and supplying an annular combustion chamber with air and means for injecting air for ventilating a turbine, this diffuser-distributor assembly comprising an annular downstream end-piece connected at its downstream end to the injection means and delimiting, with the downstream face of the impeller, an annular cavity for the circulation of ventilation air taken from the outlet of the compressor, which comprises means for drawing off, from the injection means, a fraction of said turbine ventilation airflow, and means for guiding the drawn-off air to the radially internal portion of the downstream face of the impeller, so that this airflows radially from inside to outside along the downstream face of the impeller and mixes with the air taken from the outlet of the compressor in order to reduce the temperature of the air in the annular cavity.

The ventilation air drawn off at the injection means of the circuit for ventilating the turbine is guided to the downstream face of the impeller and sweeps this downstream face, and is then mixed in the downstream cavity of the impeller with the air taken from the outlet of the compressor, which reduces the temperature of the air in this cavity. This cooling of the impeller makes it possible to have a higher air compression ratio than that of the prior art. In addition, the air for cooling the downstream face of the impeller is taken from the means for injecting air into the turbine ventilation circuit, which makes it possible to not reduce the flows of working air and therefore to maintain the performance of the turbomachine.

In one embodiment of the invention, the means for drawing off open into an annular passageway formed around the compressor shaft between the air injection means and the annular cavity.

The means for drawing-off advantageously comprise a labyrinth seal that is mounted between the shaft of the compressor and the outlet of the injection means and that regulates the airflow entering the annular passageway. The annular passageway may also comprise, at the outlet, a labyrinth seal for adjusting the airflow coming from this annular passageway and entering the downstream cavity of the impeller.

According to a variant embodiment of the invention, the injection means comprise an inlet supplied with air by the diffuser—distributor assembly and two axially opposed outlets, one of which opens into the turbine ventilation circuit and the other of which opens into the annular cavity.

Advantageously, the downstream cavity of the impeller comprises means for separating and mixing the airflow taken from the air injection means for the ventilation of the turbine and the airflow taken from the outlet of the compressor. These separation and mixing means comprise for example a cylindrical metal sheet which extends upstream from a downstream wall delimiting the cavity and which terminates at a distance from the downstream face of the impeller.

BRIEF DESCRIPTION OF THE DRAWINGS

The invention will be better understood and other details, features and advantages of the present invention will appear on reading the following description made as a nonlimiting example and with reference to the appended drawings in which.

DESCRIPTION OF THE PREFERRED EMBODIMENTS

Figure 1:
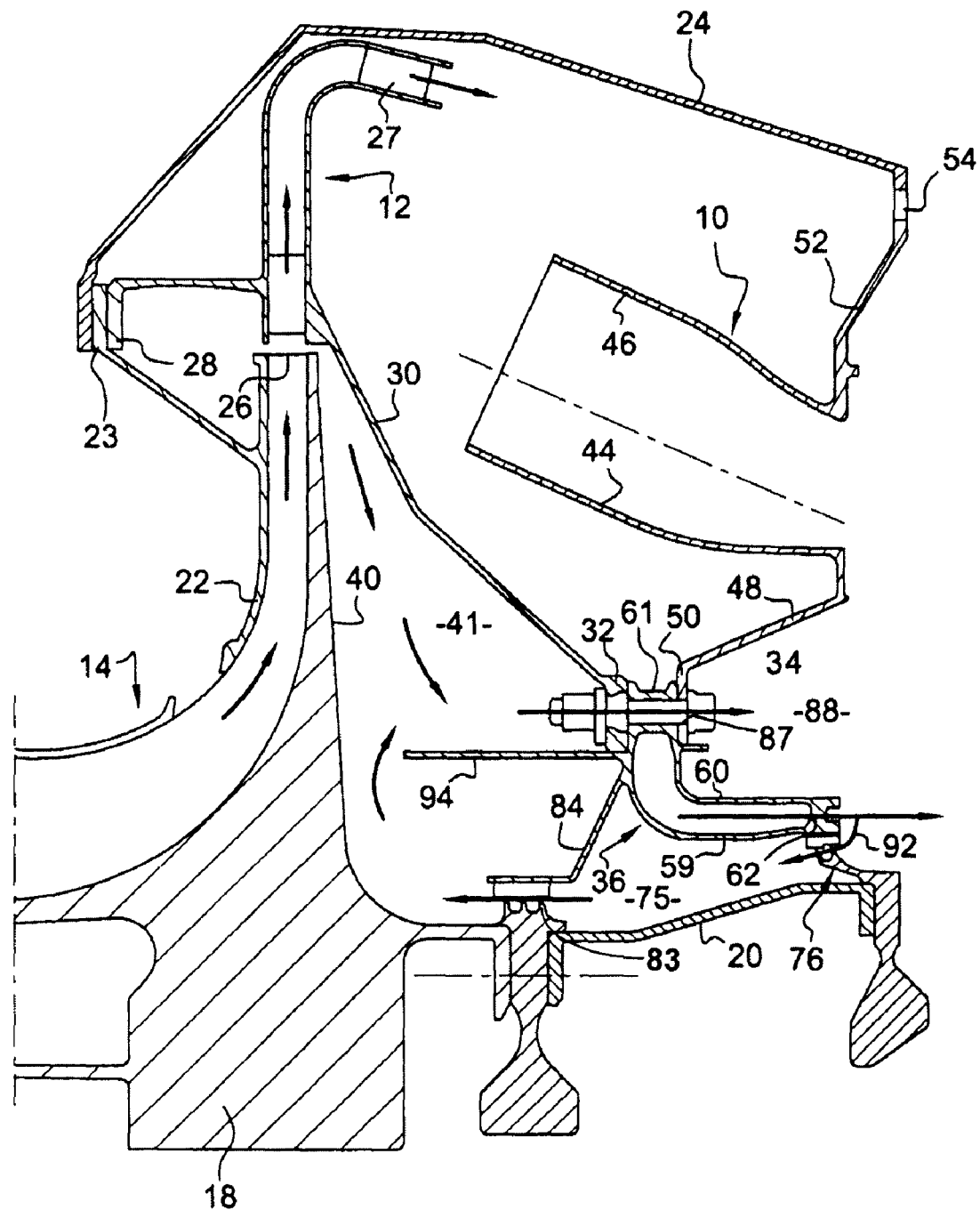
FIG. 1 is a partial schematic half-view in axial section of an embodiment of the cooling system according to the invention.

FIG. 1 represents a portion of a turbomachine, such as an aircraft turbojet or turboprop, comprising, from upstream to downstream, in the direction of the flow of gases inside the turbomachine, a compressor centrifugal stage 14, an annular diffuser-distributor assembly 12 and a combustion chamber 10.

The centrifugal compressor stage 14 comprises an impeller 18 connected to a portion of shaft 20, and a stator 22 connected via an upstream annular flange 23 to an external casing 24 of the turbomachine that extends around the compressor 14, the diffuser 12 and the combustion chamber 10.

The outlet 26 of the compressor is oriented radially outward and aligned with the inlet of the diffuser 12, the outlet of the compressor 14 being separated from the inlet of the diffuser 12 by a small radial clearance. The diffuser 12 has a bent annular shape and is connected to the distributor 27 which opens radially onto the outside of the inlet of the combustion chamber 10.

The diffuser 12 comprises an upstream annular flange 28 attached by appropriate means of the screw-nut type to the external casing 24, the flange 23 of the stator of the compressor being clamped axially between the external casing 24 and the flange 28 of the diffuser.

The diffuser 12 also comprises an annular end-piece 30 which extends downstream and inward from the inlet of the diffuser and which terminates at its downstream end in an internal annular flange 32 attached by means 34 of the screw—nut type or similar means to the means 36 for injecting air into a turbine ventilation circuit (not shown) situated downstream of the combustion chamber 10.

The end-piece 30 of the diffuser delimits, with a downstream radial face 40 of the impeller, an annular cavity 41 that is ventilated by air taken from the outlet of the compressor 14 through the aforementioned radial clearance.

The combustion chamber 10 comprises an internal wall of revolution 44 and an external wall of revolution 46 extending inside one another. The internal wall 44 is connected at its downstream end to a radially external end of a frustoconical ring 48 whose radially internal end comprises an internal annular flange 50 attached to the aforementioned injection means 36. The external wall 46 of the chamber is connected at its downstream end to a radially internal end of a frustoconical ring 52 that comprises, at its radially external end, an external annular flange 54 for attachment to the external casing 24.

A portion of the air coming out of the distributor 27 enters the chamber 10 and is mixed with fuel brought by injectors (not shown), this mixture then being burned and injected into the turbine to rotate the shaft 20. Another portion of the air originating from the distributor 27 travels round the chamber 10 and passes between the radially internal wall 44 of the chamber and the end-piece 30 of the diffuser in order to supply the injection means 36.

In the example shown in FIG. 1, the injection means 36 comprise two coaxial walls 59, 60 with a substantially L-shaped section that extend inside one another and define an angular channel bent at a right angle. The inlet 61 of the channel is oriented outward, and its outlet 62 is oriented axially and opens at its downstream end in order to supply the turbine with air.

A cylindrical annular passageway 75 is formed between the injection means 36 and the shaft 20 and extends from the outlet 62 of the injection means 36 into the cavity 41 downstream of the impeller. This passageway 75 comprises a first labyrinth seal 76 mounted between the shaft 20 and the outlet 62 of the injection means 36, and a second labyrinth seal 83 mounted upstream of the seal 76, between the shaft 20 and an annular metal sheet 84 extending upstream and inward from the injection means 36.

Axial air passage orifices 87 are formed, between the attachment means 34, on the flanges 32 and 50 of the end-piece 30 of the diffuser and of the ring 48, respectively, and are aligned with corresponding orifices formed in the walls of revolution 59, 60 of the injection means 36. These orifices 87 connect the downstream cavity 41 of the impeller to an annular air exhaust enclosure 88 situated downstream of the injection means and delimited by the ring 48 and the external wall 60 of the injection means 36.

The air coming out of the centrifugal compressor 14 flows into the downstream cavity 41 of the impeller from outside to inside and heats up by viscous friction on the downstream face 40 of the impeller.

According to the invention, a fraction of the airflow for ventilating the turbine is taken from the outlet of the injection means 36 and guided into the passageway 75 to the cavity 41 in order to cool the downstream face 40 of the impeller and reduce the air temperature in the cavity 41.

The labyrinth seals 76 and 83 are adjusted in order to define an airflow 92 flowing in the passageway 75.

The air coming out of the labyrinth seal 83 flows along the downstream face 40 of the impeller, radially from inside to outside, and is then mixed with the air taken from the outlet of the centrifugal compressor 10. This air mixture then passes into the enclosure 88 through the axial orifices 87 of the flanges 32, 50 and of the injection means 36.

In order to separate the airflow 92 taken from the outlet of the injection means 36 and the airflow taken from the outlet of the centrifugal compressor and in order to allow these flows to mix after the airflow 92 has passed over the downstream face 40 of the impeller, a cylindrical metal sheet 94 is mounted in the cavity 41 and extends axially upstream from the injection means 36 to the vicinity of the downstream face 40 of the impeller. This metal sheet 94 is situated radially between the annular array of orifices 87 for the air from the injection means 36 and the labyrinth seal 83 to pass through. The air that comes out of this seal is guided by the metal sheet 94 to the downstream face 40 of the impeller, and then mixes with the air taken from the outlet of the impeller.

Figure 2:
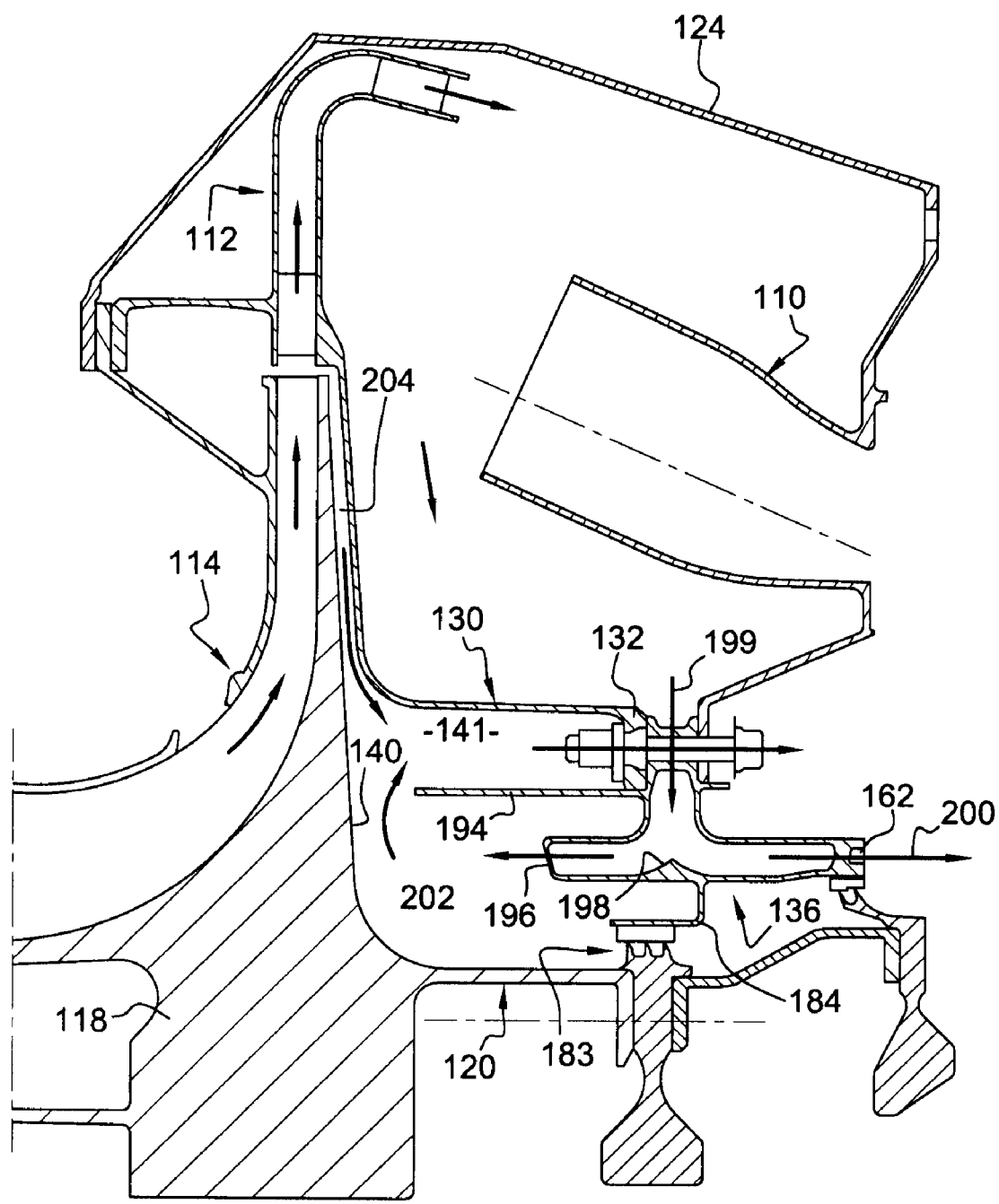
FIG. 2 is a partial schematic half-view in axial section of a variant embodiment of the invention.

A variant embodiment of the invention is shown in FIG. 2, in which the elements already described with reference to FIG. 1 are indicated by the same numbers increased by one hundred.

In this variant, the injection means 136 have a double outlet and comprise an annular T-section channel in which a second cylindrical axial outlet portion 196 is connected at its downstream end to the upstream end of the first axial outlet portion 162. This second outlet 196 opens upstream and is situated radially between the cylindrical guide metal sheet 194 and the metal sheet 184 for mounting the upstream seal 183, and its section of air passageway is, in the example shown, substantially identical to that of the first outlet 162 of the injection means 136.

Flow separation means 198 are provided in the annular channel of the injection means 136 in order to divide the airflow 199 entering the annular channel into two airflows 200, 202 supplying respectively the turbine and the downstream cavity of the impeller 118. These means 198 comprise an annular rib that is formed as a protrusion on the internal cylindrical surface of the injection means 36 and that extends in a plane perpendicular to the longitudinal axis of the injection means 136 and passing their inlet 160.

In the example shown, the end-piece 130 of the diffuser is L-shaped in axial section and comprises an upstream portion that extends substantially radially, downstream and at a short distance from the downstream face 140 of the impeller of the compressor, and a substantially cylindrical downstream portion that terminates at its downstream end in the annular flange 132 for attachment to the injection means 136. The cylindrical portion of the end-piece 130 extends substantially parallel to the metal sheet 194 and delimits the downstream cavity 141 of the impeller that communicates with the outlet of the compressor via a radial passageway 204 of small axial dimension formed between the impeller 118 and the radial portion of the end-piece 130.

The air that flows into the radial passageway 204, from outside to inside, enters the downstream cavity 141 and mixes with the air originating from the second outlet 196 of the injection means and flowing from downstream to upstream along the metal sheet 194 in order to sweep the downstream face of the impeller.

The invention claimed is:

1. A turbomachine, comprising a diffuser—distributor assembly arranged at the outlet of the impeller of a centrifugal compressor and supplying an annular combustion chamber with air and means for injecting air for ventilating a turbine, this diffuser—distributor assembly comprising an annular downstream end-piece connected at its downstream end to the injection means and delimiting, with the downstream face of the impeller, an annular cavity for the circulation of ventilation air taken from the outlet of the compressor, which comprises means for drawing off from the injection means, a fraction of said turbine ventilation airflow, and means for guiding the drawn-off air to the radially internal portion of the downstream face of the impeller, so that this airflows radially from inside to outside along the downstream face of the impeller and mixes with the air taken from the outlet of the compressor in order to reduce the temperature of the air in the annular cavity.

2. The turbomachine as claimed in claim 1, wherein the means for drawing off open into an annular passageway formed around the shaft of the compressor between the air injection means and the annular cavity.

3. The turbomachine as claimed in claim 2, wherein the means for drawing off comprise a labyrinth seal that is mounted between the shaft of the compressor and the outlet of the injection means and that regulates the airflow entering the annular passageway.

4. The turbomachine as claimed in claim 2 or 3, wherein the annular passageway comprises at the outlet a labyrinth seal for regulating the airflow coming from this annular passageway and entering the annular cavity.

5. The turbomachine as claimed in claim 1, wherein the injection means comprise an inlet supplied with air by the diffuser-distributor assembly and two axially opposed outlets, one of which opens into a circuit for ventilating the turbine and the other of which opens into the annular cavity.

6. The turbomachine as claimed in claim 1, wherein the annular cavity comprises means for separating and mixing the airflow taken from the air injection means for the ventilation of the turbine and the airflow taken from the outlet of the compressor.

7. The turbomachine as claimed in claim 6, wherein the separation and mixing means comprise a cylindrical metal sheet which extends upstream from a downstream wall delimiting the cavity and which terminates at a distance from the downstream face of the impeller.

* * * * *